United States Patent
Häglsperger et al.

(10) Patent No.: US 8,915,812 B2
(45) Date of Patent: Dec. 23, 2014

(54) HYDROSTATICALLY POWER-SPLITTING TRANSMISSION

(75) Inventors: Josef Häglsperger, Gangkofen (DE); Peter Dziuba, Frickingen-Altheim (DE); Markus Liebherr, Ennetbaden (CH); Katharina Liebherr, legal representative, Ennetbaden (CH); Josef Bauer, Nandlstadt (DE)

(73) Assignee: MALI Holding AG, Wettingen (CH)

( * ) Notice: Subject to any disclaimer, the term of this patent is extended or adjusted under 35 U.S.C. 154(b) by 1145 days.

(21) Appl. No.: 12/735,690

(22) PCT Filed: Jan. 21, 2009

(86) PCT No.: PCT/CH2009/000024
§ 371 (c)(1),
(2), (4) Date: Jul. 10, 2012

(87) PCT Pub. No.: WO2009/097701
PCT Pub. Date: Aug. 13, 2009

(65) Prior Publication Data
US 2012/0270690 A1    Oct. 25, 2012

(30) Foreign Application Priority Data

Feb. 8, 2008 (DE) .......................... 10 2008 008 236

(51) Int. Cl.
*F16H 3/72* (2006.01)
*F16H 47/04* (2006.01)
(Continued)

(52) U.S. Cl.
CPC ...... *F16H 61/433* (2013.01); *F16H 2037/0886* (2013.01); *F16H 61/423* (2013.01);
(Continued)

(58) Field of Classification Search
CPC ...... F16H 3/72; F16H 47/04; F16H 2047/045
USPC ........................................ 475/1, 6, 72, 73, 74
See application file for complete search history.

(56) References Cited

U.S. PATENT DOCUMENTS 2,956,407 A    10/1960    Grabow
(Continued)

FOREIGN PATENT DOCUMENTS

DE    26 33 718    2/1978
(Continued)

OTHER PUBLICATIONS

H. Bork et al., "Modeling, Simulation and Analysis of a Continuously Variable Power Split Tractor Transmission," Technical University of Munich, 2000 (20 pages).

*Primary Examiner* — Edwin A Young
(74) *Attorney, Agent, or Firm* — Pauley Petersen & Erickson

(57) ABSTRACT

A hydrostatically power-splitting transmission (10), particularly for agricultural and construction equipment, comprises at least two hydrostats (H2), which are hydraulically connected to each other and operate as pumps or as motors, wherein at least one of the hydrostats (H2) can be adjusted or pivoted by means of a controller (16, 20, 21; SK1, . . . SK4), mechanical coupling means (K1, K2; Z1, . . . , Z12), which couple the hydrostats (H1, H2) to an inner drive shaft (W1) and an inner driven shaft (W7), a housing (14, 31) comprising a cover (14) and a housing bottom part (31), wherein the hydrostats (H1, H2), the inner drive and driven shafts (W1, W7), and the mechanical coupling means (Z7, Z9) are disposed and attached on the bottom of the cover (14), and in the lower housing part an outer drive shaft accessible from the outside and a driven shaft are supported, which are operatively connected to the inner drive shaft or driven shaft when the housing is assembled. In such a transmission, a compact design, while simultaneously providing easy accessibility and high flexibility in the adaptation to different vehicles, is achieved in that the controller (16, 20, 21; SK1, . . . SK4) for adjustment or pivoting of the at least one hydrostat (H2) is disposed on the top of the cover (14) and acts upon the at least one hydrostat (H2) through the cover (14).

27 Claims, 15 Drawing Sheets

(51) Int. Cl.
  *F16H 61/423* (2010.01)
  *F16H 61/00* (2006.01)
  *F16H 61/433* (2010.01)
  *F16H 37/08* (2006.01)
  *F16H 37/10* (2006.01)
  *F16H 39/00* (2006.01)

(52) U.S. Cl.
  CPC ............ *F16H 47/04* (2013.01); *F16H 61/0003* (2013.01); *F16H 2037/0866* (2013.01); *F16H 2037/108* (2013.01); *F16H 2037/0873* (2013.01); *F16H 2039/005* (2013.01)
  USPC .................................................. 475/1; 475/74

(56) References Cited

U.S. PATENT DOCUMENTS

| | | | |
|---|---|---|---|
| 4,145,883 | A | 3/1979 | Forster |
| 4,286,477 | A | 9/1981 | Meyerle et al. |
| 4,446,756 | A | 5/1984 | Hagin et al. |
| 4,778,020 | A | 10/1988 | Hagin et al. |
| 4,843,907 | A | 7/1989 | Hagin et al. |
| 5,094,077 | A | 3/1992 | Okada |
| 5,492,189 | A | 2/1996 | Kriegler et al. |
| 5,584,772 | A | 12/1996 | Hayd |
| 5,766,107 | A | 6/1998 | Englisch |
| 2002/0066364 | A1 | 6/2002 | Skirde et al. |
| 2002/0125058 | A1* | 9/2002 | Wilks et al. .................. 180/243 |
| 2003/0008745 | A1 | 1/2003 | Heindl |
| 2004/0173089 | A1 | 9/2004 | Gray, Jr. et al. |
| 2008/0103006 | A1* | 5/2008 | Pollman et al. ................. 475/72 |

FOREIGN PATENT DOCUMENTS

| | | |
|---|---|---|
| DE | 27 57 300 A1 | 6/1979 |
| DE | 29 04 572 A1 | 8/1980 |
| DE | 29 50 619 A1 | 6/1981 |
| DE | 35 01 608 A1 | 7/1986 |
| DE | 37 07 382 A1 | 9/1988 |
| DE | 37 26 080 A1 | 2/1989 |
| DE | 39 12 369 A1 | 10/1990 |
| DE | 39 12 386 A1 | 10/1990 |
| DE | 43 43 401 A1 | 4/1994 |
| DE | 43 43 402 A1 | 4/1994 |
| DE | 198 33 711 A1 | 2/2000 |
| DE | 100 44 784 A1 | 4/2002 |
| DE | 101 29 488 A1 | 1/2003 |
| EP | 0 249 001 A1 | 12/1987 |
| EP | 1 273 828 A2 | 1/2003 |
| GB | 1 129 534 A | 10/1968 |
| JP | 62 224770 A | 10/1987 |
| JP | 2005 009381 A | 1/2005 |
| WO | WO 2006/042434 A | 4/2006 |

* cited by examiner

HYDROSTATICALLY POWER-SPLITTING TRANSMISSION

BACKGROUND OF THE INVENTION

1. Field of the Invention

The present invention relates to the field of transmission technology and a (continuously variable) hydrostatically power-splitting transmission.

2. Discussion of Related Art

Power-splitting transmissions, particularly for employment in vehicles of agricultural or building use, such as, for example, tractors, have been known for a long time. In such power-splitting transmissions, the power prevailing at an input shaft or drive shaft and usually output by an internal combustion engine is apportioned to a first mechanical power branch with a fixed step-up ratio and a second power branch having a continuously variable step-up ratio and is subsequently combined again in order to be available at an output shaft or take-off shaft. The second power branch is mostly designed as a hydrostatic branch in which two hydrostatic axial piston engines (hydrostats) of the oblique axis or swashplate type, which are connected to one another hydraulically, operate selectively as a pump or as a motor. The step-up ratio can in this case be varied by a variation of the pivot angle of the cylinder block or the swashplate. The apportionment of the power to the two power branches and the combining of the split powers usually take place by means of an epicyclic transmission. Power-splitting transmissions of the type described are disclosed in various configurations in DE-A1 27 57 300, in DE-C2-29 04 572, in DE-A1-29 50 619, in DE-A1-37 07 382, in DE-A1-37-26 080, in DE-A1-39 12 369, in DE-A1-39 12 386, in DE-A1-43 43 401, in DE-A1-43 43 402, in EP-B1-0 249 001 and in EP-A2-1 273 828.

So that a power-splitting transmission can be successfully employed in practice, it should, in general, be distinguished by the following properties:

The transmission should have high efficiency over the entire speed range. This should be the case particularly at the high driving speeds which are adopted in road traffic for a relatively long period of time.

The transmission should have a compact construction in order to allow installation in the most diverse possible vehicles, as far as possible without structural restrictions.

The transmission should allow the transfer of high powers.

The transmission should have as simple a construction as possible in order to limit the power losses and increase the operating reliability.

The transmission should allow fully comprehensive electronic control in conjunction with the engine management and should make available sufficient emergency running programs even in the event of a failure of specific control elements.

The initially mentioned DE-A1-43 43 402 has already described a power-splitting transmission, designated as a CHP transmission (Continuously variable Hydrostatic Power-splitting transmission), which is distinguished by two hydraulically coupled identical hydrostats of the oblique axis type of construction, which can be coupled in different ways to an epicyclic differential transmission via pairs of clutches or change-shift elements K1/K2 or K3/K4. The known CHP transmission has been employed and tested under the type designation SHL-Z in city buses. The two hydrostats employed have a pivoting range of only 0-25°. For forward travel, in this case, three driving steps or driving ranges are obtained: in the first driving range, at the starting point the hydrostatic fraction of the transferred power is 100% and then moves linearly with the speed toward zero. In the second driving range, it moves from zero to a maximum of about 27% and then back again to zero. In the third driving range, it moves from zero to a maximum value of 13% at the highest forward speed.

The hydrostatic power transfer branch of such a transmission usually comprises two hydrostatic axial piston engines which are connected hydraulically to one another and of which in each case one operates as a pump and the other as a motor. Depending on the driving step, in this case, the two engines can interchange their roles.

The hydrostatic axial piston engines constitute an essential component of the hydrostatic power-splitting transmission and decisively affect the properties of the transmission, such as, for example, the efficiency, overall size, complexity, speed range covered, type and number of driving steps, and the like. Examples of hydrostatic axial piston engines of this type are disclosed in DE-A1-198 33 711 or in DE-A1-100 44 784 or in US-A1-2004/0173089. The functioning and theory of hydrostatic axial piston engines and of a power-splitting tractor transmission equipped with them are described in a publication of TU Munich from the year 2000 by H. Bork et al., "Modellbildung, Simulation and Analyse eines stufenlosen leistungsverzweigten Traktorgetriebes [Modelling, Simulation and Analysis of a continuously variable power-splitting tractor transmission]".

In the known hydrostatic transmissions, the parts in the transmission (hydrostats, clutches, shafts, epicyclic drives, gearwheels, etc.) are installed in a housing which is oriented specially with respect to the transmission and consists of a multiplicity of housing segments. If, then, such a transmission is to be installed in a corresponding agricultural or building vehicle, either the vehicle has to be coordinated in its design with the already prefabricated transmission or the transmission has to be coordinated with the given conditions of an already existing vehicle and therefore redesigned. In both instances, a considerable extra outlay arises due to the special adaptation of the vehicle or entire transmission.

In the publication DE-A1-26 33 718, it has already been proposed to construct a simple hydrostatic transmission without power splitting so that it forms a structural unit with the cover of the transmission housing. In the transmission housing itself, only the drive and take-off shafts accessible from outside are mounted, and come into engagement via internal gearwheels with the corresponding inputs and outputs of the transmission when the cover together with the transmission is placed on the transmission housing.

What is achieved thereby is that the housing together with the drive and take-off shafts can be installed in the vehicle at an early stage, while a decision can be made later, by a cover together with a corresponding transmission unit being put in place, as to whether a mechanical or a hydrostatic transmission is to be used. Correspondingly, transmissions can be exchanged in a simple way in the already finished vehicle.

The transmission concept (structural unit of transmission and cover) known from DE-A1-26 33 718 may be useful for the simple case of a transmission without power splitting, when neither clutches nor summing members are required and only one of the hydrostats is adjusted. It is sufficient here to arrange the adjusting mechanism for the one hydrostat directly on the hydrostat inside the housing.

For the substantially more demanding concept of a continuously variable hydrostatic power-splitting transmission, however, other ways must be found not only to accommodate the markedly more complicated control, but also to place it suitably in terms of assembly and of maintenance.

SUMMARY OF THE INVENTION

One object of the invention, therefore, is to provide a hydrostatically power-splitting transmission which, while maintaining the flexible concept of the separation of transmission and housing, is distinguished by an improved arrangement of the components and, in particular, is suitable for implementing a complex continuously variable hydrostatic power-splitting transmission. An object of the invention, furthermore, is to specify a transmission concept which is especially suitable for this purpose.

The one object is achieved by means of the whole of the features of claim 1. A characterizing feature of the novel transmission is that the control for adjusting or pivoting the at least one hydrostat is arranged on the top side of the cover and acts through the cover upon the at least one hydrostat. By the control being shifted onto the top side of the cover, there is not only space for the transmission components arranged in the housing, but also access to the control from outside for assembly or maintenance purposes is made considerably easier, while close spatial proximity to the transmission components to be controlled on the underside of the cover is maintained. Thus, testing and setting work can be carried out on the transmission, without the transmission housing having to be opened. Moreover, if required, electrical and electronic and also hydraulic control components (electrically actuated hydraulic valves, measurement and control electronics, etc.) can be combined on the top side of the cover into a structural unit which does not subject the rest of the housing to any restrictions, is not exposed to the rough ambient conditions inside the housing and nevertheless is located near the transmission.

A preferred refinement of the transmission according to the invention is characterized in that the two hydrostats can be adjusted or pivoted by means of the control through the cover, in that a plurality of clutches are provided for controlling the power split, and in that a multistep epicyclic drive is provided for summing the split powers.

Another refinement of the invention is distinguished in that the two hydrostats are in each case pivotable about a pivot axis through at least about +/−45° for controlling the hydraulic power, in that the cover lies essentially in one plane, in that the pivot axes of the hydrostats are arranged perpendicularly to the plane of the cover, in that the control comprises hydraulically actuated lifting pistons which pivot the hydrostats about their pivot axis via a lever mechanism, and in that control hydraulics are provided for controlling the lifting pistons inside the control and are controlled by means of an electric control motor.

Preferably, the hydrostats are arranged with their axes of rotation parallel next to one another and parallel to the plane of the cover, and the inner drive and take-off shafts and the outer drive and take-off shafts have a common axis which is oriented parallel to the axes of rotation of the hydrostats and which is arranged between the axes of rotation of the hydrostats.

One development is characterized in that, overall, two or four clutches are provided, which are assigned in pairs to the hydrostats and are arranged in the axis of rotation of the assigned hydrostat, and in that the multistep epicyclic drive is arranged in the common axis of the inner and outer drive and take-off shafts.

Another development is distinguished in that the hydrostats are mounted pivotably between the cover and a bearing bottom parallel to the cover, which bearing bottom is fastened to the cover via lateral posts standing vertically on the cover, and in that bearing walls which stand vertically on the underside of the cover and are screwed to the bearing bottom are provided for mounting the shafts of the transmission.

According to another refinement of the invention, a lower-lying pan is formed on the housing lower part, and a hydraulic pump is arranged and fastened on the underside of the cover and, when the transmission is in the assembled state, penetrates with an intake connection piece into the pan.

Furthermore, it is conceivable and advantageous that control electronics are provided for the transmission, and that the control electronics are arranged on the top side of the cover.

The other object is achieved by means of the whole of the features of claim 13. It is essential, in this case, that, to achieve a wide continuous adjustment range, the two hydrostats are in each case pivotable about a pivot axis at least in a range of between −45° and +45° for controlling the hydraulic power.

Especially advantageously, this transmission may be provided for a hybrid drive and be coupled to an electric motor.

According to one refinement, in this case, the electric motor is coupled to the inner drive shaft via a transmission.

According to another refinement, the electric motor is arranged directly on the inner drive shaft. In particular, a disk-shaped three-phase machine known per se is suitable for this purpose.

Preferably, the electric motor is connected via control electronics to a battery, from which it obtains energy or into which it can feed energy for storage.

In addition, the electric motor may be capable of being used as a generator and/or starter and/or retarder.

Particularly in the case of vehicles of agricultural use, a second electric motor may be provided, which drives a power take-off shaft, the second electric motor being connected to a battery via second control electronics.

BRIEF DESCRIPTION OF THE DRAWINGS

The invention will be explained in more detail below, by means of exemplary embodiments, in conjunction with the drawing in which:

FIG. 1' shows an illustration, comparable to FIG. 1, of a comparable continuously variable hydraulic power-splitting transmission with only two clutches, which is especially suitable for implementing the invention;

DESCRIPTION OF THE PREFERRED EMBODIMENTS

Figure 1:
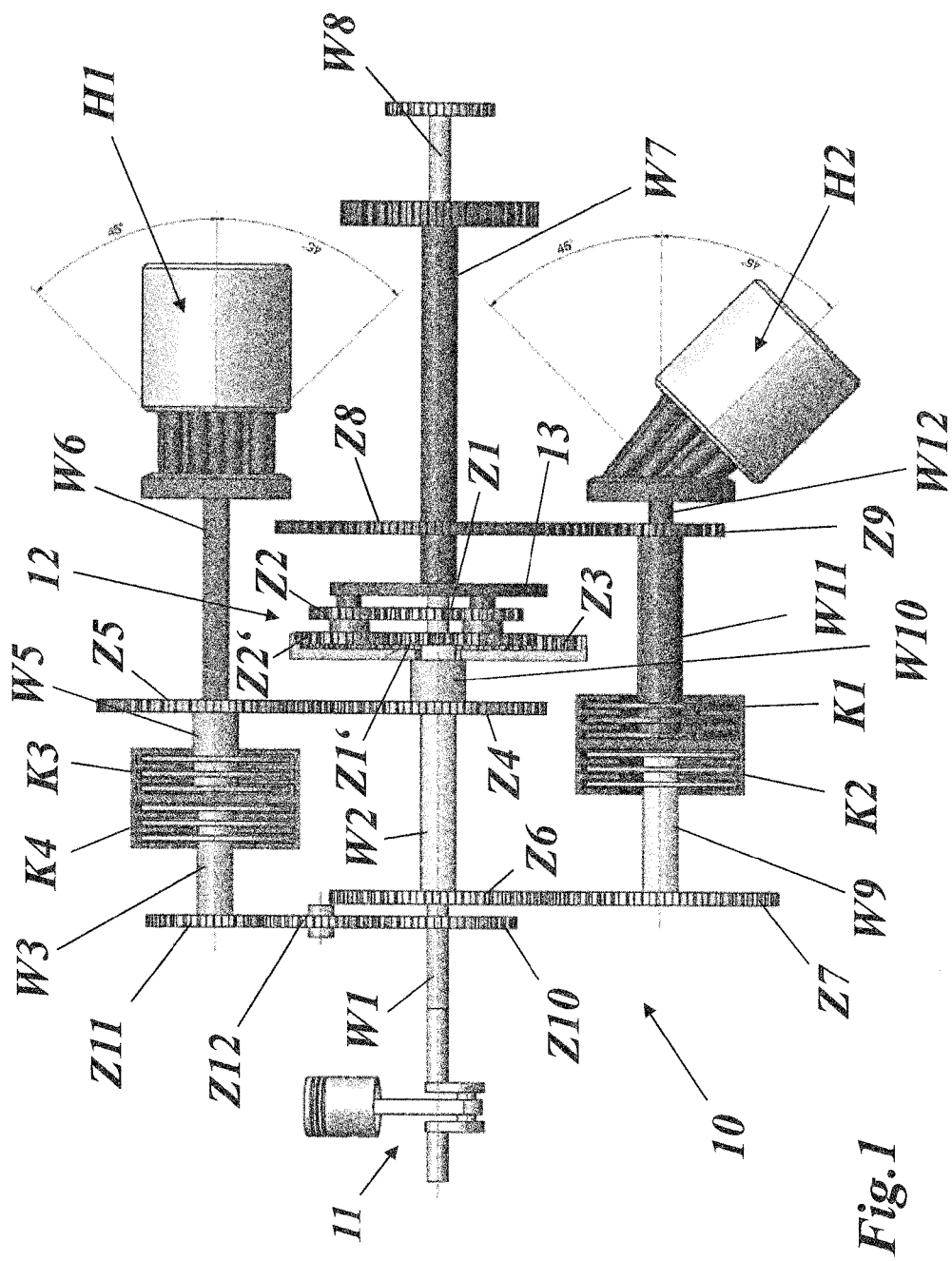
FIG. 1 shows a diagrammatic illustration of the basic set-up of a continuously variable hydraulic power-splitting transmission with four clutches overall, which is especially suitable for implementing the invention.
Figure 1:
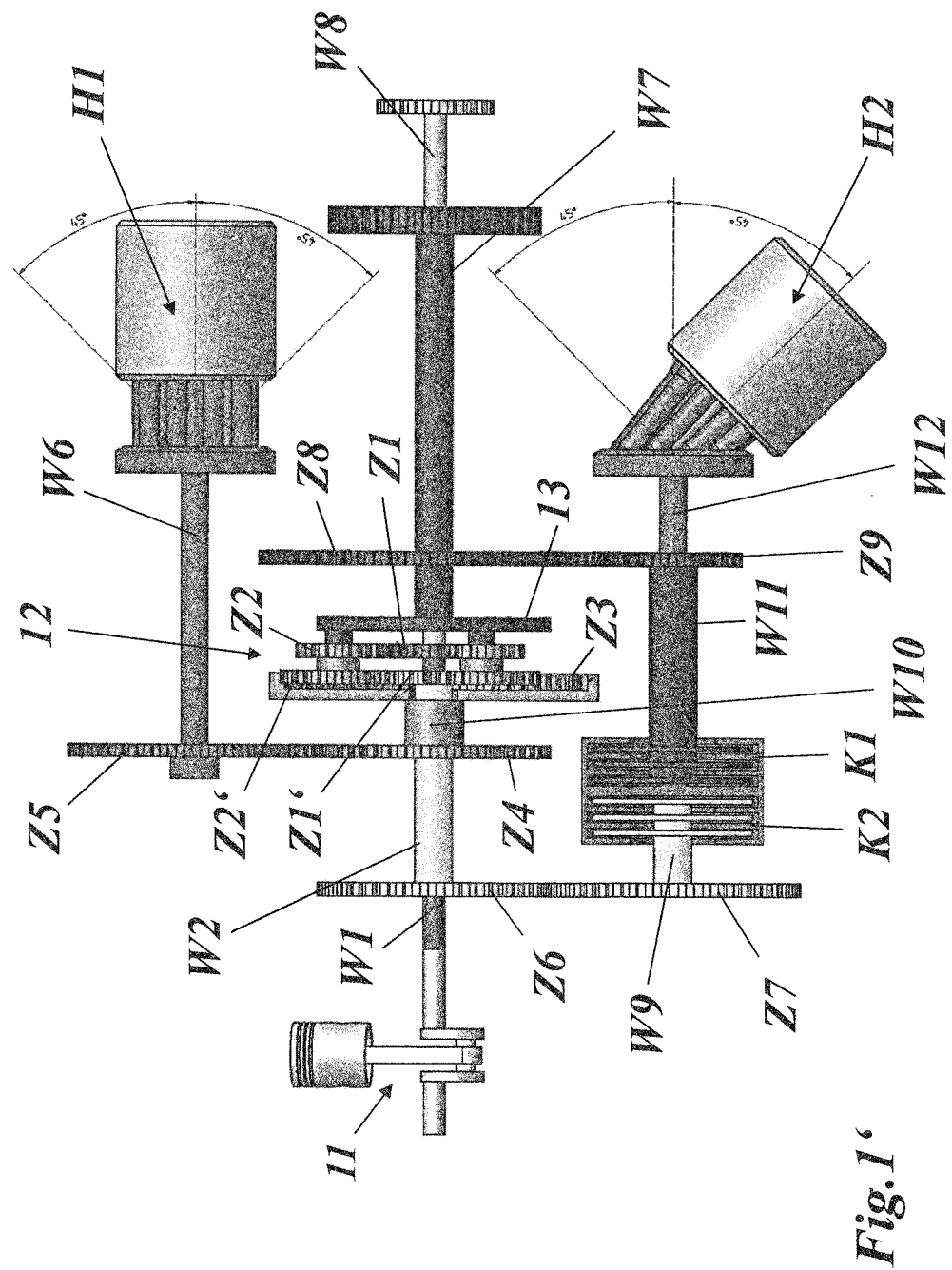

FIG. 1 illustrates a diagrammatic illustration of the basic set-up of a continuously variable hydraulic power-splitting transmission which is especially suitable for implementing the invention. The transmission 10 transfers the power of an internal combustion engine 11 which is symbolized in FIG. 1 by a piston seated on a crankshaft. The transmission 10 is connected to the internal combustion engine 11 by means of an input shaft (drive shaft) W1. Said transmission discharges the transferred power via an output shaft (take-off shaft) W7. If required, a power take-off shaft W8 extends through the transmission 10 and is a direct continuation of the input shaft W1.

The core of the transmission 10 is formed by a multistep epicyclic drive 12 with a large sun wheel Z1 and a small sun wheel Z1', with the double planet wheels Z2, Z2', with the ring wheel Z3 and with the planet web 13 connected fixedly in terms of rotation to a gearwheel Z8, and with two hydrostatic axial piston engines or hydrostats H1, H2, the take-off shafts of which, W6 and W12 respectively, can in each case be coupled differently via a pair of clutches K3, K4 and K1, K2, respectively, to the input shaft W1, to the output shaft W7 and to the multistep epicyclic drive 12. The hydrostats H1 and H2, which operate selectively as a pump and as a motor, are connected to one another hydraulically via high-pressure lines, not illustrated. The first hydrostat H1 can be coupled with its take-off shaft W6 to the ring wheel Z3 by means of the clutch K3 via a counter gear consisting of the gear wheel Z5 and of a gear wheel Z4 connected fixedly in terms of rotation to the ring wheel Z3. However, it can also be coupled to the input shaft W1 by means of the clutch K4 via the gearwheel Z11, the intermediate wheel Z12 and the gearwheel Z10 arranged fixedly in terms of rotation on the input shaft shaft W1.

The second hydrostat H2 can be coupled with its take-off shaft W12, on the one hand, to the planet web 13 and consequently to the output shaft W7 by means of the clutch K1 via the hollow shaft W11 and the gearwheel Z9 which is arranged fixedly in terms of rotation on the latter and which meshes with the gearwheel Z8. It can, on the other hand, be coupled to the smaller sun wheel Z1' of the multistep epicyclic drive 12 by means of the clutch K2 via the pair of gearwheels Z7, Z6 and the hollow shaft W2.

The power prevailing at the input shaft W1 is apportioned in the transmission 10, by the multistep epicyclic drive 12, to two power branches, to be precise to a mechanical power branch and a hydraulic power branch, and is combined again later at the output shaft W7. The mechanical power branch runs from the input shaft W1 via the larger sun wheel Z1 which is connected fixedly in terms of rotation to the input shaft W1, the double planet wheels Z2, the planet web 13 and the gearwheel Z8. The hydraulic power branch runs via the two hydraulically connected hydrostats H1 and H2 and is designed differently, depending on the shifting of the clutches K1, . . . , K4. As indicated in FIG. 1 of the drawing, the two hydrostats H1 and H2 can in each case be pivoted through +/−45°.

Figure 2:
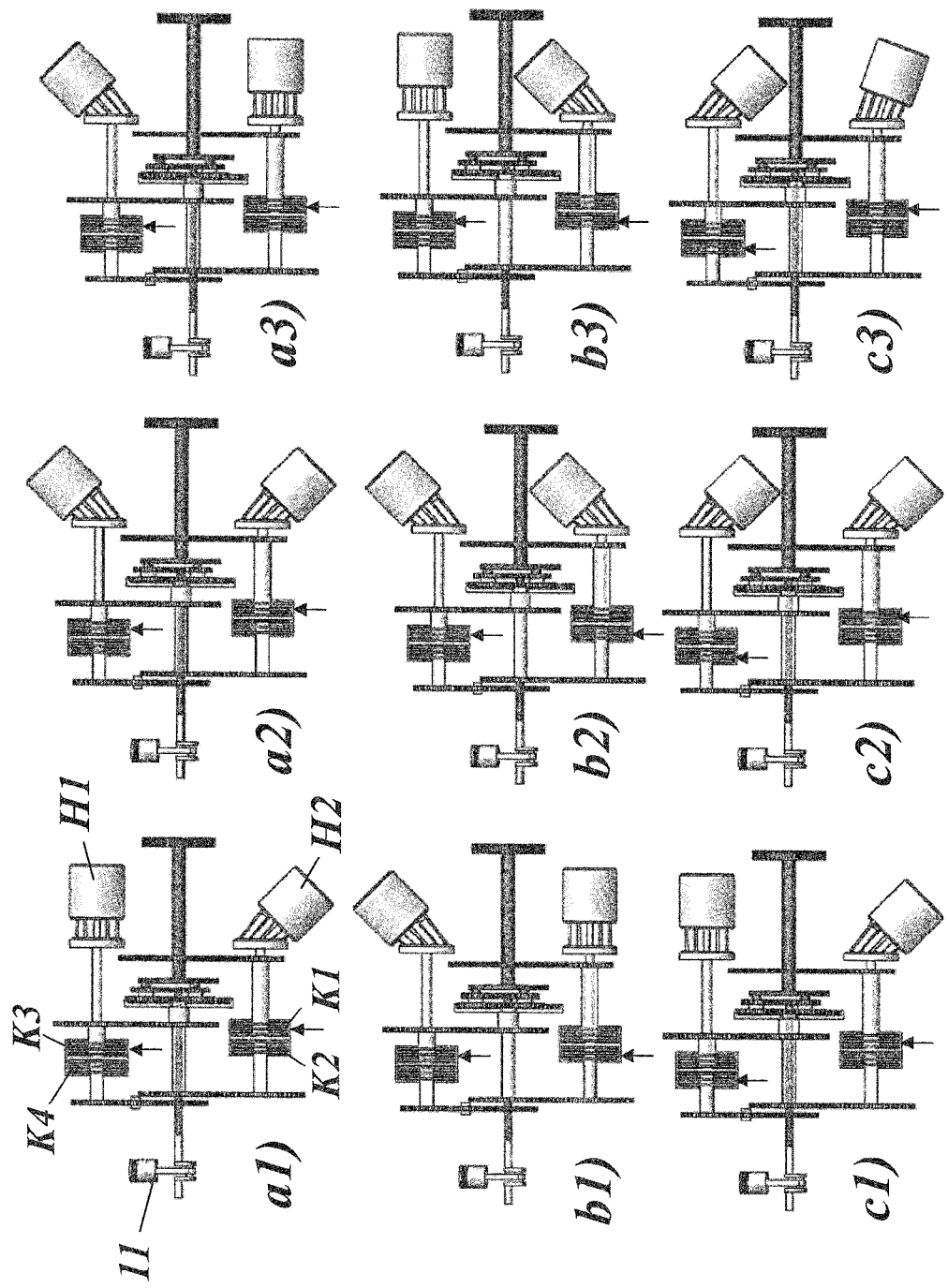
FIG. 2 shows the various driving steps of the power-splitting transmission according to FIG. 1 with a first forward driving step (FIG. 2(a1) to 2(a3)), with a second forward driving step (FIG. 2(b1) to 2(b3)) and with a reverse driving step (FIG. 2(c1) to 2(c3)); corresponding driving steps with the same pivoting movements of the hydrostats H1 and H2 and with the same positions of the clutches K1 and K2 also apply to the transmission according to FIG. 1'.

The shifting of the clutches K1, . . . , K4 and the pivoting position of the hydrostats H1, H2 for the various operating states of the transmission 10 are illustrated in FIG. 2, FIG. 2(*a*1) to 2(*a*3) showing the first forward driving step, FIG. 2(*b*1) to 2(*b*3) the second forward driving step and FIG. 2(*c*1) to 2(*c*3) reverse drive. During starting (FIG. 2(*a*1)), as in the entire first forward driving step, the clutches K3 and K1 are actuated (marked in FIG. 2 by the short arrows), so that the first hydrostat H1 is coupled to the ring wheel Z3 of the multistep epicyclic drive 12 and the second hydrostat H2 is coupled to the planet web 13 or to the gearwheel Z8 or to the output shaft W7. The first hydrostat H1, which operates as a pump in the first forward driving step, is first unpivoted (pivot angle 0°), whereas the second hydrostat H2 operating as a motor is pivoted out fully (maximum pivot angle 45°). On account of the zero position of the first hydrostat H1, no pressure medium is pumped to the second hydrostat H2, and therefore also no power is transferred hydraulically. The starting operation is initiated in that the first hydrostat H1 is pivoted gradually, the volume increasingly being pumped to the second hydrostat H2, and the second hydrostat beginning to rotate with high torque and an increasing speed. When the first hydrostat H1 is pivoted out fully (FIG. 2(*a*2)), the first phase of the first driving step is concluded. In the second phase, with the first hydrostat H1 pivoted out fully, the second hydrostat H2 is gradually moved back from the maximum pivot angle to the pivot angle 0° (FIG. 2(*a*3)), the rotational speed being increased ever further with a decreasing torque. At the end of the first driving step, the second hydrostat H2 no longer absorbs any torque and the rotational speed of the first hydrostat H1 approaches zero. The hydrostatically transferred power approaches zero, and the entire power is transferred mechanically (this corresponds to about 33% of the maximum driving speed in FIG. 3).

For the transition from the first driving step to the second driving step (FIG. 2(*a*3)→FIG. 2(*b*1)), the clutch K1 is opened and the clutch K2 is closed. Since the second hydrostat H2 does not absorb any torque at the pivot angle 0°, the changeover takes place virtually without any shift moment. The second hydrostat H2 is then coupled to the smaller sun wheel Z1' of the multistep epicyclic drive 12. As a result of the full pivoting of the hydrostats H1, H2, the directions of flow between the hydrostats are automatically reversed. In the second driving step, the first hydrostat H1 operates as a motor and the second hydrostat H2 as a pump. As in the first driving step, the hydrostat operating as a pump (now the second hydrostat H2), in a first phase, is pivoted out gradually from the pivot angle 0° onto the other side to the maximum pivot angle (FIG. 2(*b*2)), while the hydrostat operating as a motor (now the first hydrostat H1) remains pivoted out fully on the same side. In a subsequent second phase (FIG. 2(*b*2)→FIG. 2(*b*3)), the first hydrostat H1 is then pivoted back into the zero position. At the end of the second driving step, the hydraulically transferred power once again approaches zero; the entire power is transferred via the mechanical power branch.

Figure 3:
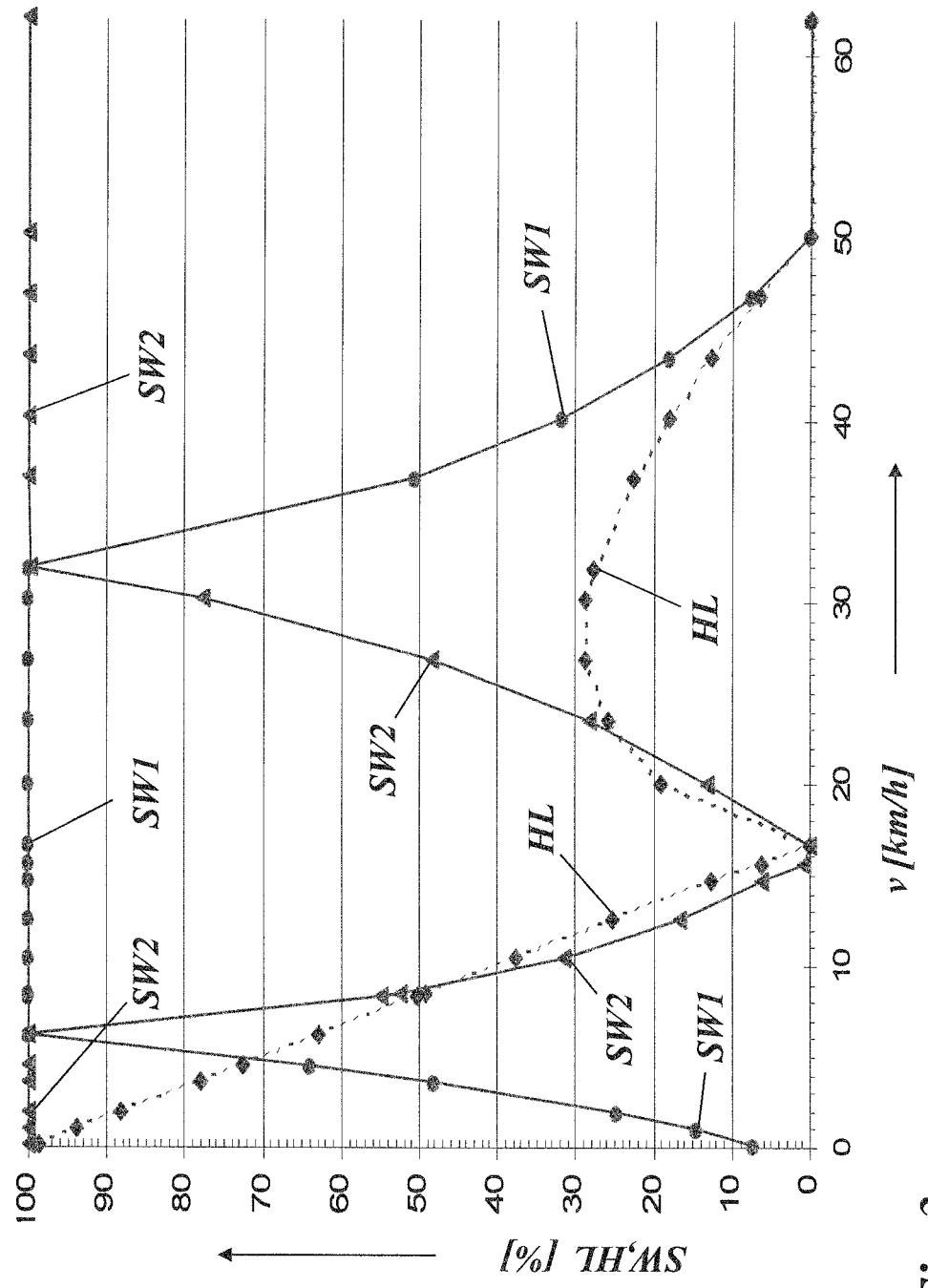
FIG. 3 shows the pivot angles SW1, 2 of the two hydrostats and the hydraulic power fraction HL against the speed v in the two forward driving steps for the transmission according to FIGS. 1 and 2.
Figure 4:
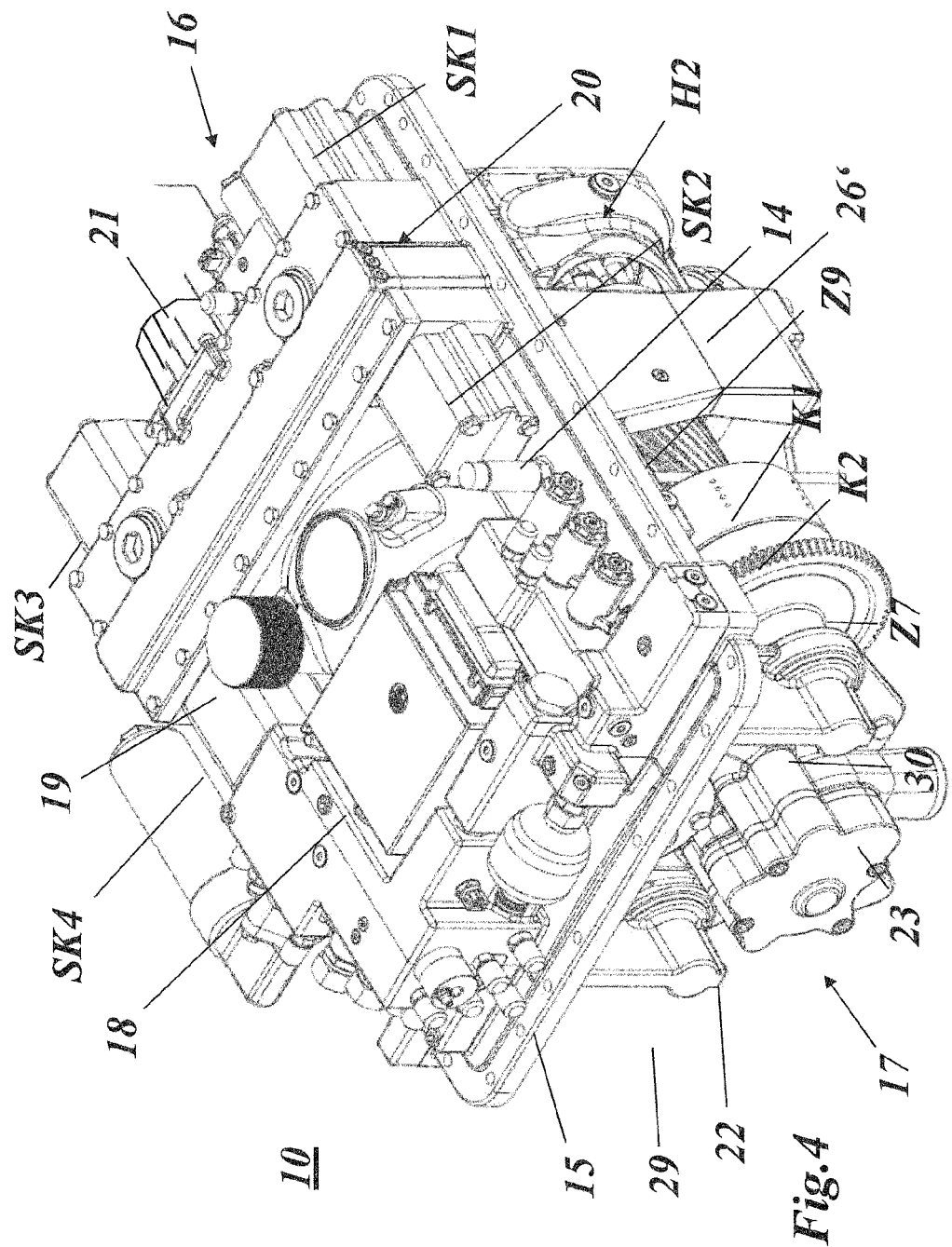
FIG. 4 shows a perspective illustration (seen obliquely from above) of a transmission according to the principle illustrated in FIG. 1, according to a preferred exemplary embodiment of the invention, only the cover with the transmission arranged below it and with the control arranged above it being shown.

The graph, obtained for a power-splitting transmission according to FIG. 1-8 in a tractor, of the pivot angles SW1, 2 of the two hydrostats and of the percentage of the hydrostatically transferred power HL as a function of the vehicle speed v, is reproduced in FIG. 3. On account of the 45°-hydrostats employed in the transmission 10, the entire driving range extending from 0 to the final speed can be subdivided into only two driving steps, the first driving step extending from 0 to about 33% and the second driving step from 33% to 100%. In the first driving step, the fraction of hydrostatically transferred power decreases from an initial 100% linearly to 0. In the second driving step, the fraction of hydrostatically transferred power rises from 0 to a maximum of approximately 30% at about 50% of the maximum driving speed and then falls to 0% again. The result of this is that the efficiency at the end of the second driving step does not fall again. This results, for high driving speeds which are maintained over a lengthy period of time during driving across country, in an especially high efficiency of the transmission which leads to markedly lowered operating costs.

In reverse drive (FIG. 2(c1) to 2(c3)), starting from the situation in FIG. 2(a1), there is a changeover from the clutch K3 to the clutch K4 (in the configuration of FIG. 1' operating without the clutches K3 and K4, the changeover is to a power-split reverse drive). The first hydrostat H1 operating as a pump is then driven directly by the input shaft W1 and is pivoted out from 0° gradually onto the other side. The fully pivoted-out second hydrostat H2 is pivoted back (FIG. 2(c3)) and thus picks up rotational speed further.

In the transmission configuration illustrated in FIG. 1', the clutches K3 and K4 and the associated shafts W3, W5 and gearwheels Z10, Z11 and Z12 are absent. The driving steps of this transmission 10' operating with only two clutches K1 and K2 have the same division as shown in FIG. 2. The hydrostats H1 and H2 execute the same pivoting movement and the clutches K1 and K2 are changed over between the driving steps in the same way.

In a transmission of the type illustrated in FIG. 1 or 1', then, according to the invention installation in a housing consisting of a cover and of a housing lower part is carried out that the actual transmission with the hydrostats, the shafts, the clutches, the gearwheels and the multistep epicyclic drive is arranged on the underside of the cover and with the cover forms a structural unit, while the electrical, electronic, mechanical and hydraulic control is arranged on the top side of the cover and likewise with the cover forms a structural unit. This affords a compact form of the transmission, high flexibility in adapting the housing lower part to the respective vehicle and excellent accessibility to the control with its various components.

A power-splitting transmission implemented according to the transmission diagram from FIG. 1, according to a preferred exemplary embodiment of the invention, is reproduced in FIG. 4 to 8, as seen from various viewing angles, only the cover with the transmission arranged below it and with the control arranged above it being shown. The associated housing lower part may be configured differently, depending on requirements.

A (non-restricting) example of such a housing lower part is illustrated in FIG. 9 to 12, as seen from various viewing angles.

The transmission 10 of FIG. 4 to 8 comprises as a carrying part an essentially rectangular cover 14 which is bordered by a continuous flange 15 lying in one plane and provided with bores for screwing to the housing lower part 31 from FIG. 9 to 12. The transmission components (hydrostats, clutches, gearwheels and shafts), illustrated diagrammatically in FIG. 1, are arranged and mounted on the underside of the cover 14 in the actual transmission core 17 in three mutually parallel axes forming an equilateral triangle. The first hydrostat H1 with the shafts W3, W5 and W6, with the gearwheels Z5 and Z11 and with the clutches K3 and K4 is located in one axis. The second hydrostat H2 with the shafts W9, W11 and W12, with the gearwheels Z7 and Z9 and with the clutches K1 and K2 is located in the second axis. The third, middle axis comprises W2, W7 and W10, the multistep epicyclic drive 12 and the gearwheels Z4, Z6, Z8 and Z10.

Essential components for mounting and holding the transmission core 17 on the underside of the cover 14 are a bearing bottom 27 oriented parallel to the cover 14, two lateral posts 26, 26' emanating vertically downward from the cover 14 and two bearing walls 28, 28' likewise emanating vertically downward from the cover 14. The bearing bottom 27 delimits the transmission core 17 on the underside. Said bearing bottom is screwed to the posts 26, 26' and to the bearing walls 28, 28'. The lower pivot bearings 24, 25 for the housings, in each case pivotable about a vertical axis, of the hydrostats H1 and H2 are arranged in the bearing bottom 27. The upper pivot bearings are accommodated in the cover 14 itself, but this cannot be seen. The mutually parallel bearing walls 28, 28' standing perpendicularly to the three axes of the transmission core 17 serve for mounting the shafts belonging to the axes.

In particular, the shafts W9 and W3 coming from the clutches K1/K2 and K3/K4 are mounted in the front bearing wall 28. The associated bearings are in each case designed as a structural unit with control hydraulics 29 and 30 which are connected to the control on the top side of the cover and actuate the clutches K1, . . . , K4 via axial bores inside the shafts W3 and W9. The oil pressure required for the control hydraulics is generated by a hydraulic pump 22 which sucks in oil, via a downwardly directed intake connection piece 23, out of the oil sump formed in a pan 32 of the housing lower part 31 (FIG. 9-11) and which conducts it further on to the control via ducts integrated in the bearing wall 28.

Figure 5:
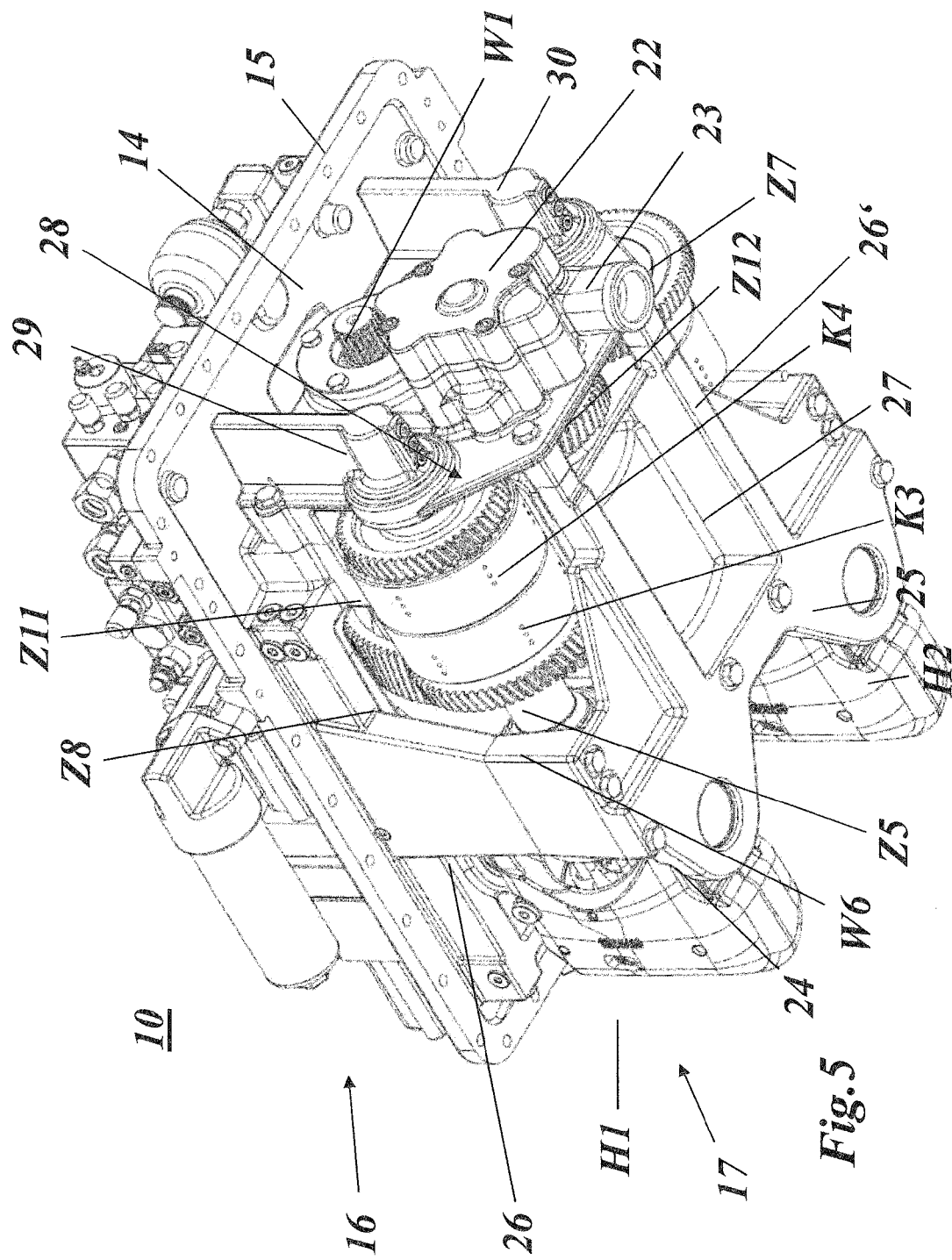
FIG. 5 shows a perspective illustration (seen obliquely from below) of a transmission according to FIG. 4.
Figure 6:
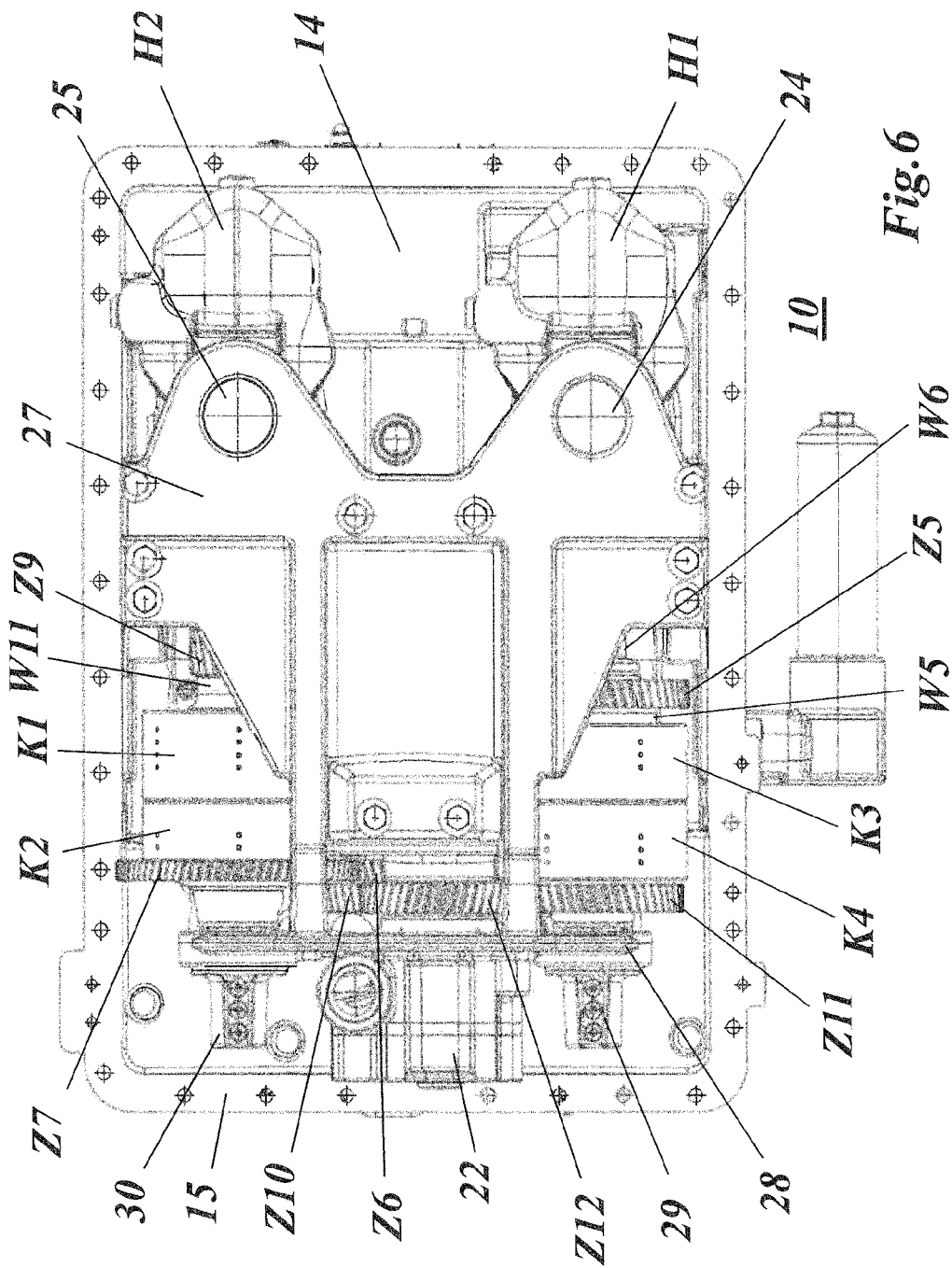
FIG. 6 shows a bottom view of the transmission from FIG. 4.
Figure 7:
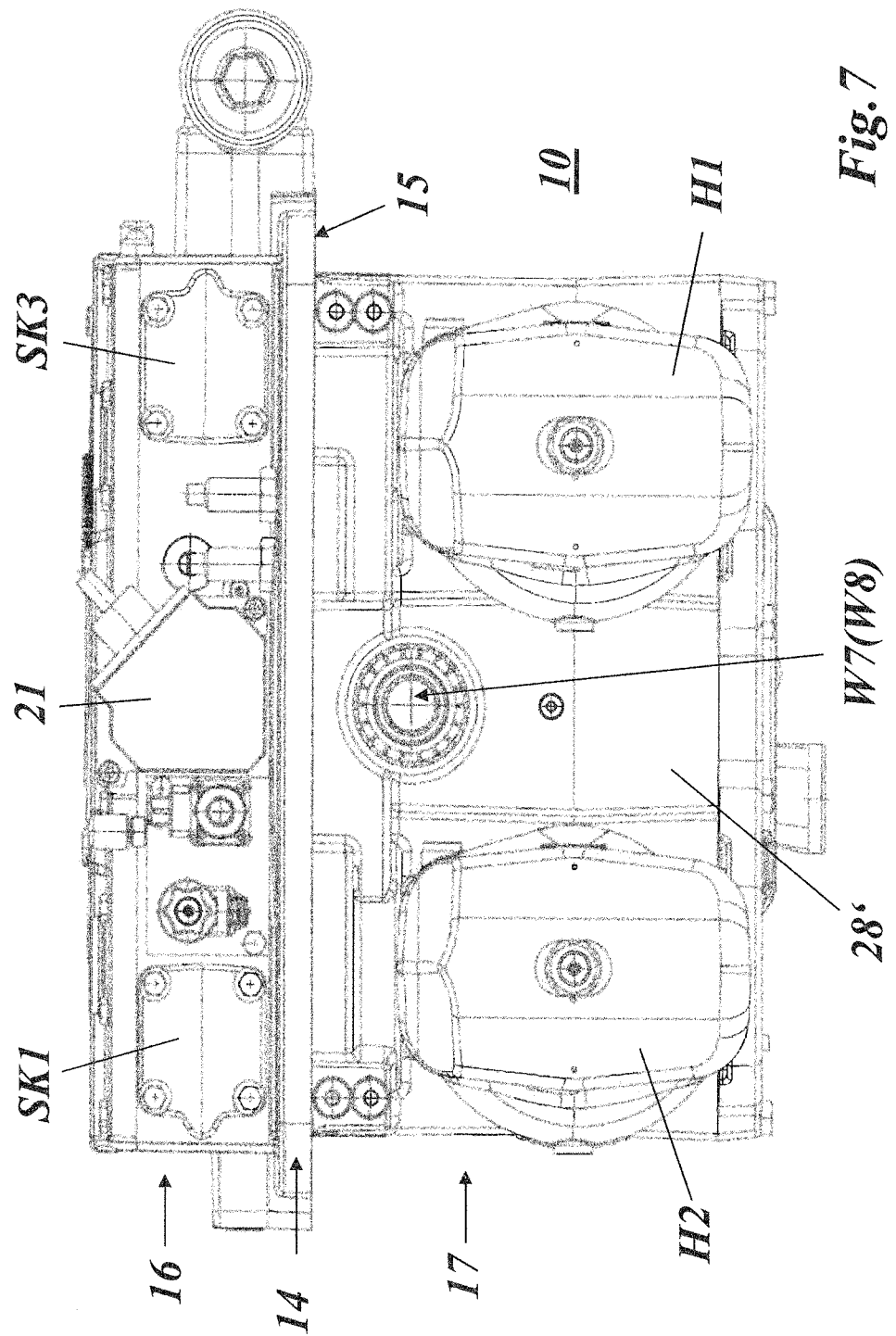
FIG. 7 shows a rear view of the transmission from FIG. 4.
Figure 8:
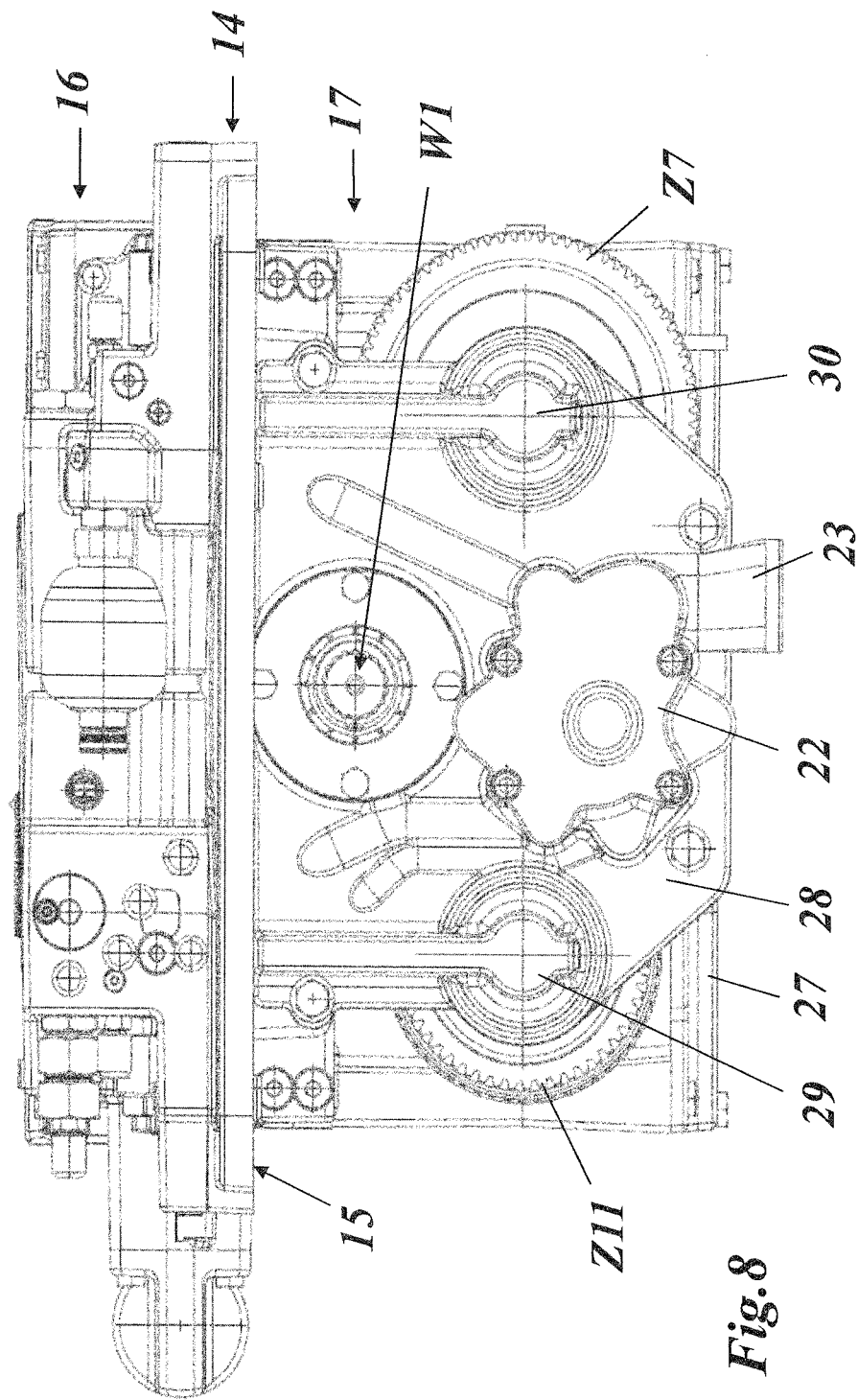
FIG. 8 shows a front view of the transmission from FIG. 4.
Figure 9:
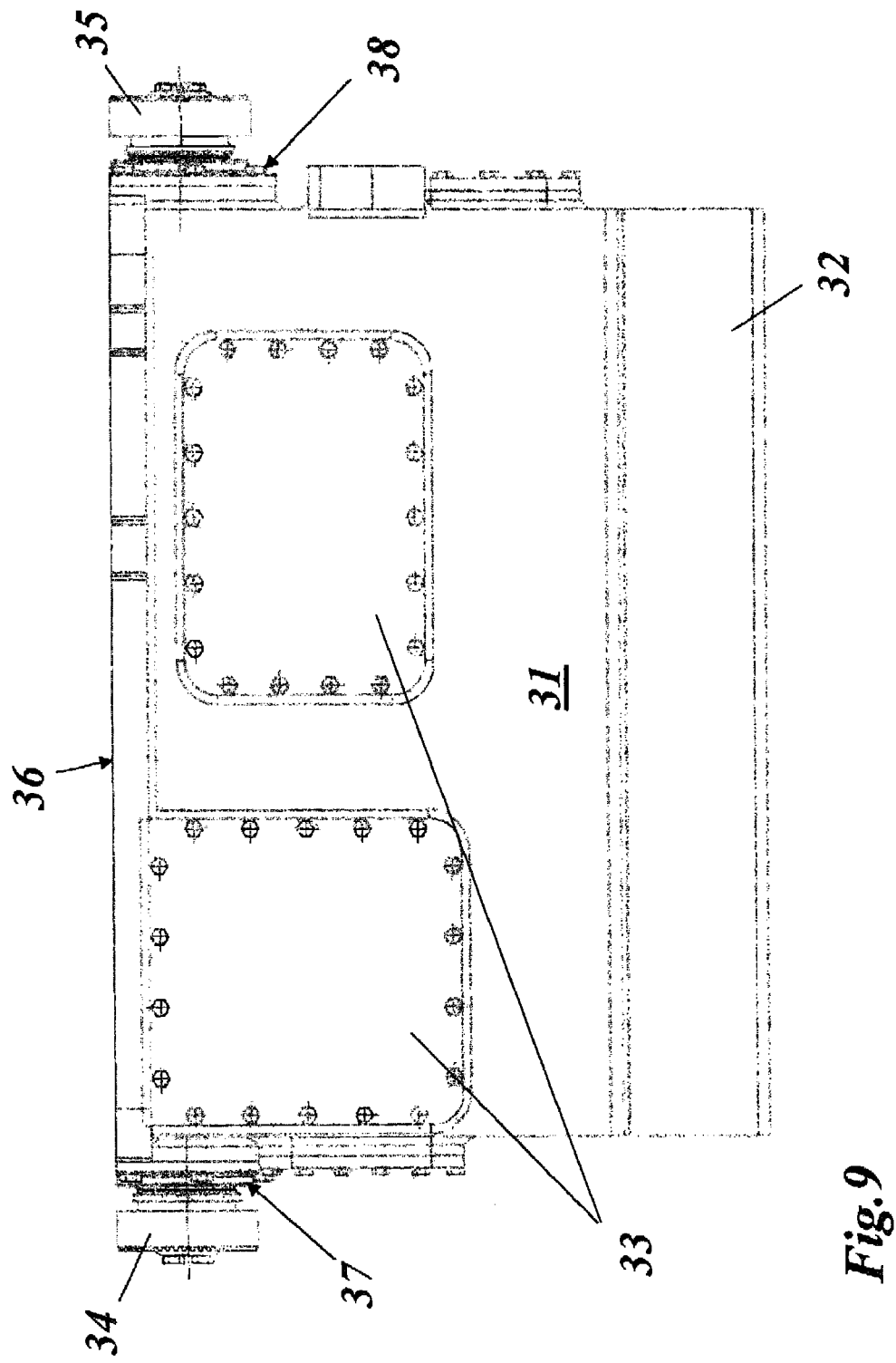
FIG. 9-11 show two side views of a housing lower part fitting with the transmission according to FIG. 4.
Figure 10:
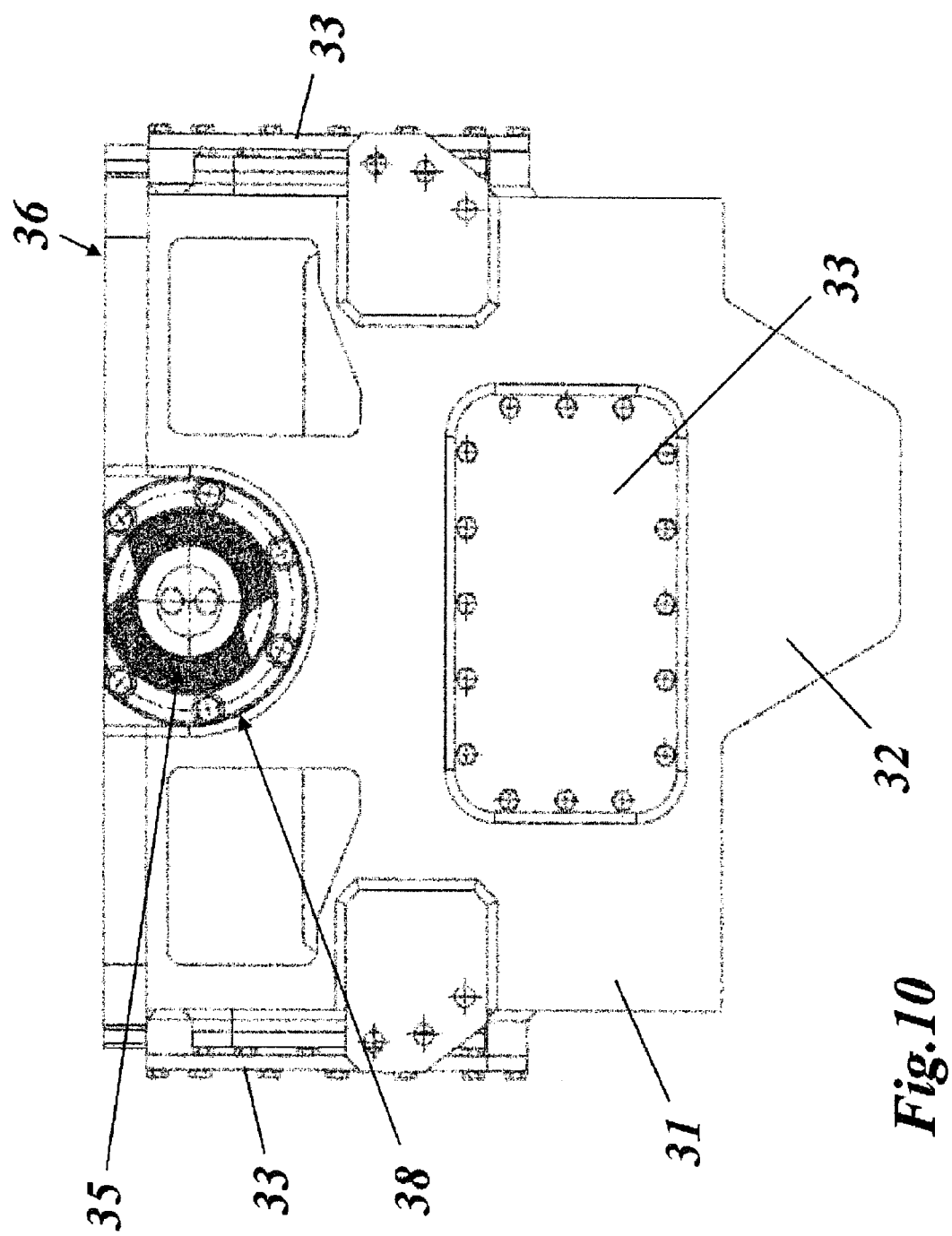
Figure 11:
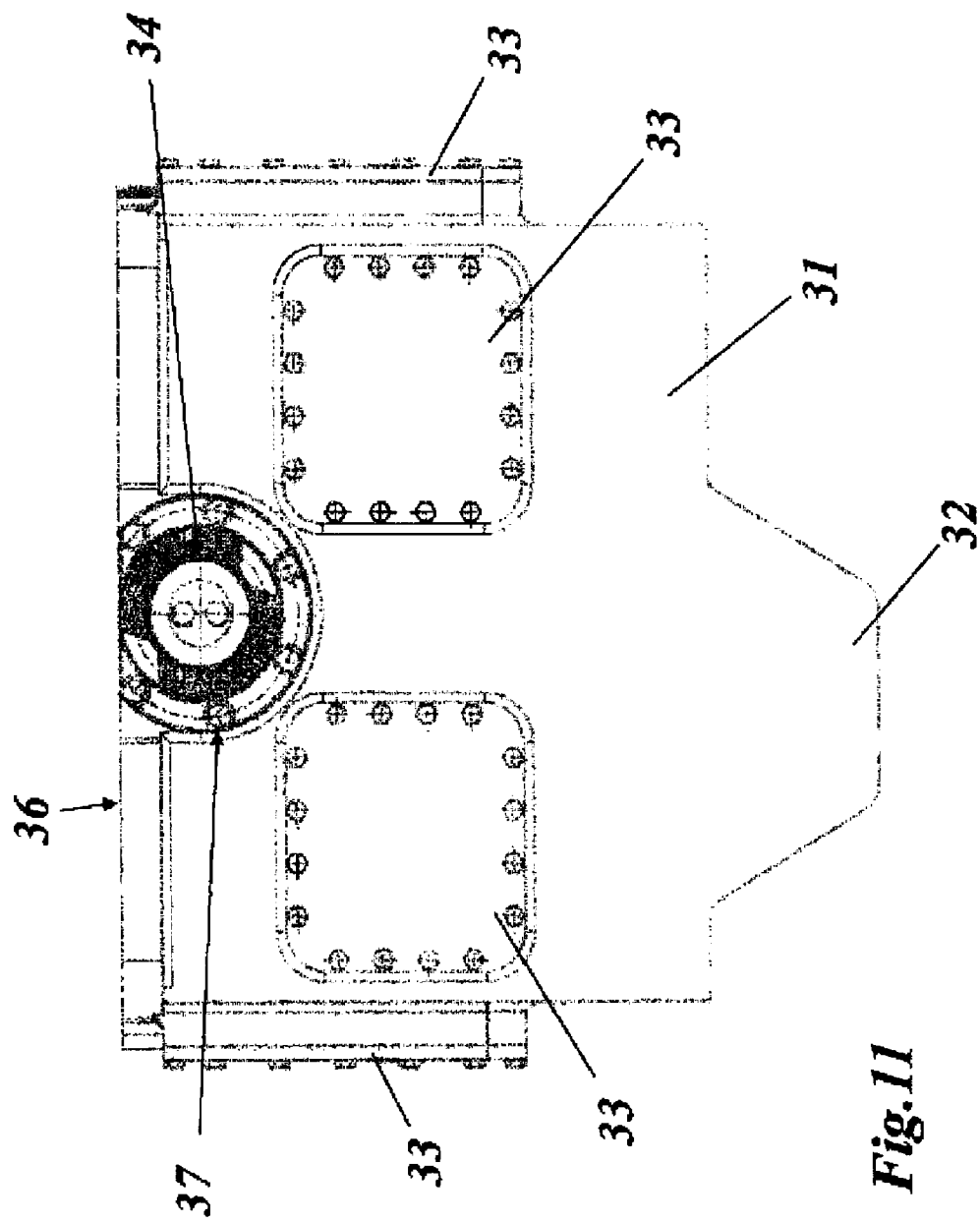
Figure 12:
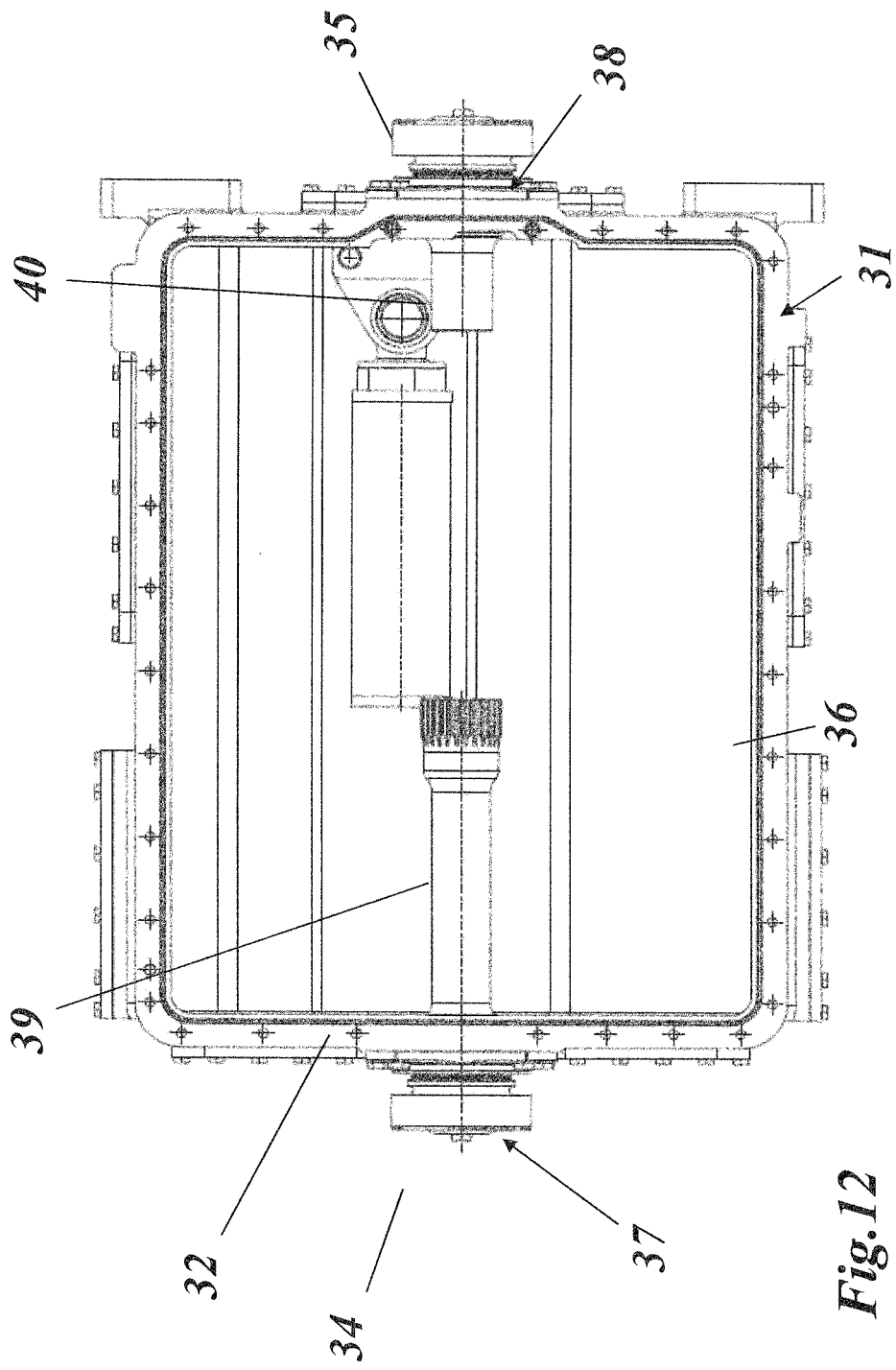
FIG. 12 shows a view from above into the housing lower part according to FIG. 9-11.

The input shaft or inner drive shaft W1, which is provided with a serration and via which the power from the engine is fed into the transmission by means of an outer drive shaft (40 in FIG. 12) mounted in the housing lower part 31, projects out of the front bearing wall 28 in the third, middle axis (FIG. 5, 8). The inner take-off shaft W7, which is likewise provided with a serration and via which the power from the transmission can be discharged outward by means of an outer take-off shaft (39 in FIG. 12) mounted in the housing lower part 31, is accessible through the rear bearing wall 28'. The two outer shafts 39, 40 are coaxial to the third, middle axis of the transmission core 17. They are in each connected to a clutch 34 and 35, respectively, which is located outside the housing lower part 31 and via which the transmission 10 can be installed in the drive train of the associated vehicle.

The transmission control necessary for operating the transmission core 17 is accommodated on the top side of the cover 14 so that action upon the transmission induced by the transmission control 16 takes place directly through the cover 14: one type of action is the control of the hydrostats H1 and H2, which, on the one hand, requires a pivoting of the pivot housings through a maximum of +/−45° and, on the other hand, influences the hydraulic connection between the two hydrostats. For this purpose, control hydraulics 20 in the form of control blocks are provided on the cover top side directly above the two hydrostats H1, H2. Each of the two hydrostats H1, H2 is assigned two opposite, hydraulically actuated lifting pistons SK1, SK2 and SK3, SK4, respectively, which pivot the associated hydrostat H2 or H1 via a lever mechanism located in the control block 20. The hydraulic control of the lifting pistons SK1, SK4 and of the hydraulic connection between the hydrostats H1, H2 is controlled by a rotatable control piston in the control block 20, said control piston being driven by an electric control motor 21. The direct connection between the control block 20 and the hydrostats H1, H2 lying below it achieves an extremely compact set-up which allows easy access to the individual components of the control from above and at the same time permits high adaptability to the vehicle surroundings on the housing lower part 31.

A compact set-up, good accessibility and short travels also arise due to the arrangement of the control electronics 18 in a box directly on the cover 14. The control electronics 18 evaluate physical measurement variables from the transmission and also commands from the engine control and the operating elements of the vehicle and outputs control commands to the control motor 21 and to hydraulic valves which are arranged around the control electronics 18 on the cover 14 and with the aid of which the clutches K1, ..., K4 are actuated. For this purpose, the necessary microprocessors and power outputs are accommodated in the control electronics 18. Likewise located on the cover 14 is a closable filling orifice 19 for the oil which is required in the transmission for the hydraulic tasks.

The compact transmission block illustrated in FIG. 4 to 8 and consisting of a cover 14, transmission core 17 (below the cover) and transmission control 16 (above the cover) contains everything which is required for the functioning of the hydrostatic power-splitting transmission. As reproduced in FIG. 9 to 12, the housing lower part 31 has correspondingly only the functions of protecting the transmission core 17, of holding the oil for the transmission and of feeding the power into the transmission and out of the transmission again. As shown in the example of FIG. 9 to 12, the infeed and outfeed may in this case take place by means of simple coaxial shafts 39, 40 which are mounted rotatably in the housing lower part 31. However, deflection and/or conversion transmissions may also be provided, which change the position and orientation of the axes. Thus, by means of the same transmission block, a multiplicity of drive solutions can be implemented in different vehicles by the housing lower part 31 simply being adapted to the vehicle.

An appropriate flange 36 is formed on the housing lower part 31 for oil-tight connection to the cover 14. The shafts 39 and 40 are mounted rotatably in the end walls of the housing lower part 31 by means of corresponding bearings 37, 38. Formed in the bottom of the housing lower part 31 is a recessed pan 32 which extends in the longitudinal direction and in which a sump of the hydraulic oil can collect and be sucked in on the transmission core 17 by the hydraulic pump 22. Access orifices 33 which are closable by means of covers and through which access can be had to the inside of the transmission when the latter is closed can be arranged in the side walls of the housing lower part 31.

The transmission according to the invention is distinguished, overall, by the following properties and advantages:

The multistep epicyclic drive acts as a power-splitting and summing transmission and is used as an optimal solution for the basic set-up.

The hydrostatic power range is implemented by the +/−45° large-angle technique with major advantages in terms of efficiency and spread in this transmission.

If, therefore, the basic mechanical set-up is taken and combined with the large-angle technique, and if it is supplemented, as required, with axial offset, power take-off shaft and all-wheel drive, an optimal transmission concept is obtained, which can satisfy all vehicle requirements and allows both the axially offset and an inline variant.

The transmission is constructed according to a modular principle.

It is power-split hydrostatically.

It has a multistep epicyclic drive with splitting and summing.

There are 2 forward driving ranges without a traction interruption.

2 large-angle hydrostats with a +/−45° pivot angle are used.

The transfer of force is continuous in the entire operating range.

The transmission has high overall efficiency without dips.

Full hydrostat power is required only during starting.

Full traction during starting is always available.

A driving clutch is unnecessary since the function is already present.

Speeds higher than 65 km/h are possible.

Low speeds with reduced engine rotational speed are possible.

The initial rotational speed can be regulated continuously between 0 and 3000 rev/min without a traction interruption.

The torque spread from input to output amounts to approximately 7.8.

Various driving strategies are possible.

Control takes place via an actuating unit.

The electronics have a modular set-up.

Further operation or emergency drive is possible even in the event of a fault of the electrics or electronics.

It will appreciated that the transmission 10 and 10' set up according to FIG. 1 and/or FIG. 1' can be used advantageously not only within the framework of the present compact cover/housing concept, but also in another connection or with another housing configuration.

In particular, the continuous regulation of the initial rotational speed, without shift operations and without traction interruption, as is afforded in the transmission concept of FIG. 1, makes this concept especially suitable, irrespective of the actual design and installation configuration of the transmission, for hybrid drives in the sector of buses and agricultural and building vehicles, in which the drive takes place selectively via an internal combustion engine and/or an electric motor and, in the case of regenerative braking, kinetic energy can be recovered via the electric motor acting as a generator and be stored in the battery. Although it is already known from the prior art (DE-A1-38 42 632) to provide hydrostatic/mechanical power-splitting transmissions in a hybrid drive, nevertheless this known solution results in highly complicated and cumbersome control and regulation due to the use of a flywheel and of a change-shift clutch with a neutral shift position.

If, by contrast, a hybrid drive with a continuously variable hydrostatic power-splitting transmission according to FIG. 1 is implemented, the control of the electric drive part can be simplified considerably on account of the uniform operation of the transmission. A first exemplary embodiment of such a hybrid drive is reproduced in FIG. 13 in a greatly simplified diagram: a first electric motor E1 acting as a driving motor is coupled fixedly to the gearwheel Z11 and consequently to the input shaft W1 via a gearwheel Z13. The first electric motor E1 is supplied with the necessary electrical energy from a suitable battery 42 via first control electronics 41. The first control electronics 41 cooperate with the motor and transmission control (not illustrated in FIG. 13). In certain instances, the first electric motor E1 may in this case drive the vehicle alone (for example, a bus in city traffic). It may, however, also assist the internal combustion engine 11. In particular, it is advantageous if the first electric motor E1 is used as an electrodynamic retarder or if the electric motor E1, particularly within the framework of regenerative braking, operates as a generator and feeds energy back into the battery 42 for storage (see the double arrows between the first control electronics 41 and the first electric motor E1 and also the battery 42). By means of an appropriate control of the transmission 10, the electric motor/generator E1 can in this case always be operated in the optimal range. A lithium ion battery, which combines a high storage capacity with a high performance, is preferably used as a battery 42.

Figure 13:
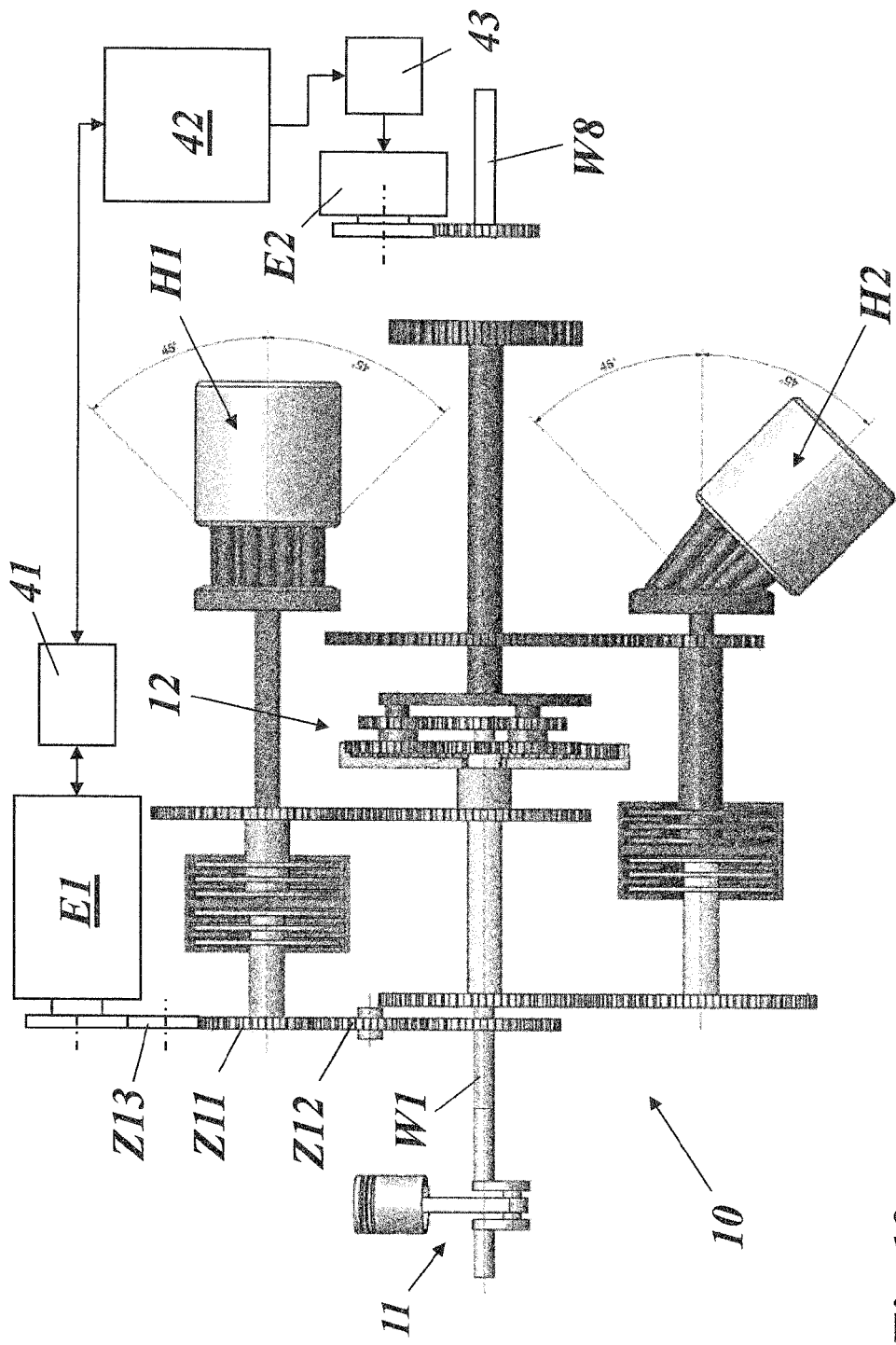
FIG. 13 shows a transmission according to FIG. 1 with additional electric motors for a hybrid drive or an electrically driven power take-off shaft.

The hybrid drive by means of the battery 42 and by the first electric motor E1 affords the possibility of driving and controlling a power take-off shaft W8 according to FIG. 13 by means of a second electric motor E2 independently of the other operating conditions of the vehicle drive. For this purpose, second control electronics 43 are provided between the battery 42 and the second electric motor E2. The second control electronics 43 can operate largely independently of the motor and transmission control, but must take into account at least the instantaneous loading and the charging state of the battery 42.

In the coupling of the first electric motor E1 to the input shaft W1 via a gearwheel mechanism Z11, Z12, Z13, the type of electric motor E1 can be chosen largely freely, because the electric motor E1 can, for example, be arranged laterally on the transmission, where the overall length pays only a minor role.

Figure 14:
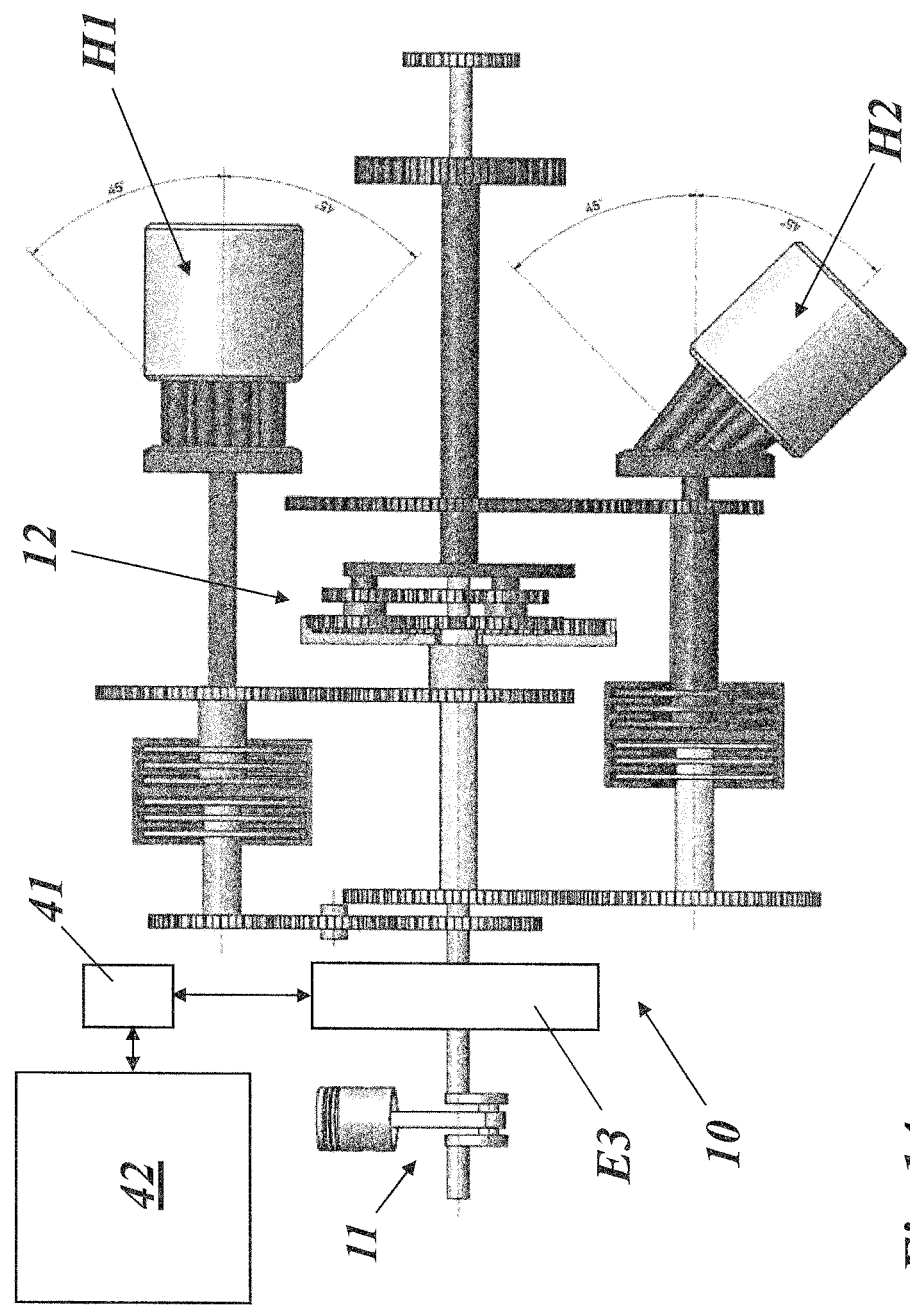
FIG. 14 shows a transmission according to FIG. 1 with an additional electric motor, seated directly on the drive shaft, for a hybrid drive.

However, it is also conceivable, according to the exemplary embodiment shown in FIG. 14, to arrange the rotor of an electric motor E3 fixedly in terms of rotation on the input shaft W1 directly. For reasons of space, what is known as a disk-shaped three-phase machine, such as is described, for example, in the publication DE-A1-10 2006 019 837, is especially suitable for this purpose. This can take over not only the function of a drive motor, but at the same time the functions of a starter and dynamo and also a retarder and can be flanged directly to the transmission in a space-saving way. As compared with the normal hybrid drive which in any case saves energy, the continuously variable power-splitting transmission affords a considerable additional energy saving. When a disk-shaped three-phase machine is used as an electric motor/generator, an especially compact and efficient drive train is implemented to great advantage.

The invention claimed is:

1. A hydrostatically power-splitting transmission (10, 10') for vehicles, comprising:
    at least two hydrostats (H1, H2) which are connected hydraulically to one another and operate as a pump or as a motor, at least one of the hydrostats (H1, H2) being adjustable or pivotable by means of a control (16, 20, 21; SK1, . . . , SK4);
    mechanical coupling means (12, K1, . . . , K4; Z1, . . . , Z12) which couple the hydrostats (H1, H2) to an inner drive shaft (W1) and to an inner take-off shaft (W7);
    a housing (14, 31) comprising a cover (14) and a housing lower part (31);
    the hydrostats (H1, H2), the inner drive and take-off shafts (W1, W7) and the mechanical coupling means (12, K1, . . . , K4; Z1, . . . , Z12) arranged and fastened on the underside of the cover (14); and
    an outer drive shaft (40) and take-off shaft (39) mounted in the housing lower part (31) and with the housing (14, 31) assembled, are operatively connected to the inner drive shaft (W1) or take-off shaft (W7);
    wherein the control (16, 20, 21; SK1, . . . , SK4) for adjusting or pivoting the at least one hydrostat (H1, H2) is arranged on the top side of the cover (14) and acts upon the at least one hydrostat (H1, H2) through the cover (14).

2. The hydrostatic transmission as claimed in claim 1, wherein the two hydrostats (H1, H2) are adjustable or pivotable by means of the control (16, 20, 21; SK1, . . . , SK4) through the cover (14).

3. The hydrostatic transmission as claimed in claim 2, further comprising:
    a plurality of clutches (K1, . . . , K4) for controlling the power split, and
    a multistep epicyclic drive (12) for summing split powers.

4. The hydrostatic transmission as claimed in claim 3, wherein the cover (14) lies essentially in one plane, and the two hydrostats (H1, H2) are in each case pivotable about a pivot axis at least in a range of between −45° and +45° for controlling the hydraulic power, the pivot axes of the hydrostats (H1, H2) arranged perpendicularly to the plane of the cover (14).

5. The hydrostatic transmission as claimed in claim 4, wherein the control (16) comprises hydraulically actuated lifting pistons (SK1, . . . , SK4) which pivot the hydrostats (H1, H2) about their pivot axis via a lever mechanism.

6. The hydrostatic transmission as claimed in claim 5, further comprising:
    control hydraulics (20) for controlling the lifting pistons (SK1, . . . , SK4) inside the control (16); and
    an electric control motor (21) for controlling the control hydraulics.

7. The hydrostatic transmission as claimed in claim 4, wherein the hydrostats (H1, H2) are arranged with their axes of rotation parallel to one another and parallel to the plane of the cover (14), in that the inner drive and take-off shafts (W1, W7) and the outer drive and take-off shafts (39, 40) have a common axis which is oriented parallel to the axes of rotation of the hydrostats (H1, H2) and which is arranged between the axes of rotation of the hydrostats (H1, H2).

8. The hydrostatic transmission as claimed in claim 7, wherein at least two clutches (K1, . . . , K4) are provided, which are assigned in pairs to the hydrostats (H1, H2) and are arranged in the axis of rotation of the assigned hydrostat, and in that the multistep epicyclic drive (12) is arranged in the common axis of the inner and outer drive and take-off shafts (W1, W7; 39, 40).

9. The hydrostatic transmission as claimed in claim 4, further comprising:
    a bearing bottom (27) parallel to the cover (14), wherein the hydrostats (H1, H2) are mounted pivotably between the cover (14) and the bearing bottom (27), which is fastened to the cover (14) via lateral posts (26) standing vertically on the cover (14).

10. The hydrostatic transmission as claimed in claim 9, further comprising:
    bearing walls (28, 28') which stand vertically on the underside of the cover (14) and are screwed to the bearing bottom (27) for mounting the shafts (W1, . . . , W12) of the transmission (10).

11. The hydrostatic transmission as claimed in claim 1, further comprising:
    a lower-lying pan (32) formed on the housing lower part (31), and
    a hydraulic pump (22) arranged and fastened on the underside of the cover (14) and, when the transmission (10) is in the assembled state, penetrates with an intake connection piece (23) into the pan (32).

12. The hydrostatic transmission as claimed in claim 1, further comprising:
    control electronics (18) for the transmission (10) arranged on the top side of the cover (14).

13. The hydrostatic transmission as claimed in claim 1, wherein the transmission (10) is provided for a hybrid drive and is coupled to an electric motor (E1, E3).

14. The hydrostatic transmission as claimed in claim 13, wherein the electric motor (E1) is coupled to the inner drive shaft (W1) via a transmission (Z11, Z12, Z13).

15. The hydrostatic transmission as claimed in claim 14, wherein the electric motor (E1, E3) is connected via control electronics (41) to a battery (42).

16. The hydrostatic transmission as claimed in claim 14, wherein the electric motor (E1, E3) can be used additionally as at least one of a generator, a starter and a retarder.

17. The hydrostatic transmission as claimed in claim 14, further comprising:
a second electric motor (E2) which drives a power take-off shaft (W8).

18. The hydrostatic transmission as claimed in claim 17, wherein the second electric motor (E2) is connected to a battery (42) via second control electronics (43).

19. The hydrostatic transmission as claimed in claim 13, wherein the electric motor (E3) is arranged directly on the inner drive shaft (W1).

20. A hydrostatically power-splitting transmission (10, 10') for vehicles, comprising
at least two hydrostats (H1, H2) which are connected hydraulically to one another and operate selectively as a pump or as a motor and can be adjusted or pivoted by means of a control (16, 20, 21; SK1, . . . , SK4),
mechanical coupling means (12, K1, . . . , K4; Z1, . . . , Z12) which couple the hydrostats (H1, H2) to an inner drive shaft (W1) and an inner take-off shaft (W7),
a plurality of clutches (K1, . . . , K4) provided for controlling the power split, and a multistep epicyclic drive (12) provided for summing the split powers, and
the two hydrostats (H1, H2) being pivotable about a pivot axis at least in a range of between −45° and +45° for controlling the hydraulic power,
wherein the transmission (10, 10') is provided for a hybrid drive and is coupled to an electric motor (E1, E3).

21. The hydrostatic transmission as claimed in claim 20, wherein the electric motor (E1) is coupled to the inner drive shaft (W1) via a transmission (Z11, Z12, Z13).

22. The hydrostatic transmission as claimed in claim 21, wherein the electric motor (E1, E3) is connected via control electronics (41) to a battery (42).

23. The hydrostatic transmission as claimed in claim 20, wherein the electric motor (E3) is arranged directly on the inner drive shaft (W1).

24. The hydrostatic transmission as claimed in claim 20, wherein the electric motor (E1, E3) can be used additionally as at least on one of a generator, a starter and a retarder.

25. The hydrostatic transmission as claimed in claim 20 further comprising:
a second electric motor (E2) which drives a power take-off shaft (W8).

26. The hydrostatic transmission as claimed in claim 25, wherein the second electric motor (E2) is connected to a battery (42) via second control electronics (43).

27. A method for operating a hydrostatically power-splitting transmission (10, 10') for vehicles, comprising:
hydraulically connecting at least two hydrostats (H1, H2) to one another, wherein the at least two hydrostats (H1, H2) are selectively operable as a pump or as a motor and are adjustable or pivotable with a control (16, 20, 21; SK1, . . . , SK4);
coupling the at least two hydrostats (H1, H2) with a mechanical coupling means (12, K1, . . . , K4; Z1, . . . , Z12) to an inner drive shaft (W1) and an inner take-off shaft (W7);
controlling a power split with a plurality of clutches (K1, . . . , K4);
summing powers of the power split with a multistep epicyclic drive (12), wherein each of the at least two hydrostats (H1, H2) are pivotable about a pivot axis at least in a range of between −45° and +45° for controlling the hydraulic power;
wherein a first forward driving step includes initially operating the first hydrostat (H1) as a pump in an unpivoted position, and initially operating the second hydrostat (H2) as a motor in a fully pivoted out position, and then gradually pivoting the first hydrostat (H1) until the first hydrostat (H1) is in a fully pivoted out position, with the first hydrostat (H1) in the fully pivoted out position, and then gradually moving the second hydrostat (H2) from the fully pivoted out position to an unpivoted position; and
wherein a second driving step includes initially operating the first hydrostat (H1) as a motor in the fully pivoted position and initially operating the second hydrostat (H2) as a pump in the unpivoted position, and then gradually moving the second hydrostat (H2) from the unpivoted position to a fully pivoted out position on an other side, with the second hydrostat (H1) in the fully pivoted out position on the other side, and then gradually moving the first hydrostat (H1) from the fully pivoted out position back to the unpivoted position.

* * * * *